(12) United States Patent
Kohzuki et al.

(10) Patent No.: US 11,261,342 B2
(45) Date of Patent: Mar. 1, 2022

(54) CLEANING SOLUTION, SET OF INK AND CLEANING SOLUTION, CLEANING METHOD, CLEANING APPARATUS, PRINTING METHOD, AND PRINTING APPARATUS

(71) Applicant: RICOH COMPANY, LTD., Tokyo (JP)

(72) Inventors: Shizuka Kohzuki, Kanagawa (JP); Akiko Bannai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 199 days.

(21) Appl. No.: 16/344,279

(22) PCT Filed: Oct. 24, 2017

(86) PCT No.: PCT/JP2017/038261
§ 371 (c)(1),
(2) Date: Apr. 23, 2019

(87) PCT Pub. No.: WO2018/079513
PCT Pub. Date: May 3, 2018

(65) Prior Publication Data
US 2019/0270903 A1 Sep. 5, 2019

(30) Foreign Application Priority Data

Oct. 27, 2016 (JP) .............................. JP2016-210923
Sep. 21, 2017 (JP) .............................. JP2017-181103

(51) Int. Cl.
*C09D 11/54* (2014.01)
*C11D 3/43* (2006.01)
(Continued)

(52) U.S. Cl.
CPC ........... *C09D 11/54* (2013.01); *B41J 2/16535* (2013.01); *B41J 2/16552* (2013.01);
(Continued)

(58) Field of Classification Search
CPC ............ C09D 11/54; C11D 11/40; C11D 1/72
See application file for complete search history.

(56) References Cited

U.S. PATENT DOCUMENTS 8,889,764 B2* 11/2014 Nakajima ................ B41J 2/165
523/160
2010/0126529 A1 5/2010 Seki et al.
(Continued)

FOREIGN PATENT DOCUMENTS

EP 2 682 269 A1 1/2014
JP 4872781 B2 12/2011
(Continued)

OTHER PUBLICATIONS

International Search Report dated Jan. 15, 2018 for counterpart International Patent Application No. PCT/JP2017/038261 filed Oct. 24, 2017.
(Continued)

*Primary Examiner* — Nicole M. Buie-Hatcher
*Assistant Examiner* — M. Reza Asdjodi
(74) *Attorney, Agent, or Firm* — Grüneberg and Myers PLLC (57) ABSTRACT

Provided is a cleaning solution including: water; a compound represented by general formula (1) below; a glycol ether solves in an amount of greater than 5 g in 100 g of water having a temperature of 25 degrees C., and a proportion of the glycol ether compound is 1 percent by mass or greater but 30 percent by mass or less, and wherein in general formula (1) below, $R^1$ represents an alkyl group containing 1 or more but 4 or less carbon atoms.

(Continued)

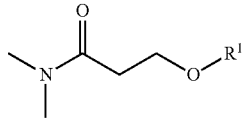

(1)

12 Claims, 2 Drawing Sheets (51) Int. Cl.

| | |
|---|---|
| *C11D 3/32* | (2006.01) |
| *B41J 2/165* | (2006.01) |
| *C09D 11/033* | (2014.01) |
| *C09D 11/037* | (2014.01) |
| *C09D 11/322* | (2014.01) |
| *C11D 1/72* | (2006.01) |
| *C11D 1/82* | (2006.01) |
| *C11D 3/20* | (2006.01) |
| *C11D 11/00* | (2006.01) |
| *C09D 11/40* | (2014.01) |

(52) U.S. Cl.
CPC .......... *C09D 11/033* (2013.01); *C09D 11/037* (2013.01); *C09D 11/322* (2013.01); *C09D 11/40* (2013.01); *C11D 1/72* (2013.01); *C11D 1/82* (2013.01); *C11D 3/2068* (2013.01); *C11D 3/32* (2013.01); *C11D 3/43* (2013.01); *C11D 11/0041* (2013.01); *B41J 2002/1655* (2013.01); *B41J 2002/16558* (2013.01)

(56) References Cited

U.S. PATENT DOCUMENTS

| | | | | |
|---|---|---|---|---|
| 2012/0306964 | A1* | 12/2012 | Nakajima | C09D 11/38 347/22 |
| 2014/0085376 | A1* | 3/2014 | Kato | C09D 11/30 347/33 |
| 2016/0264805 | A1* | 9/2016 | Nagase | C09D 11/36 |
| 2016/0264808 | A1* | 9/2016 | Kido | C09D 11/106 |
| 2017/0183528 | A1* | 6/2017 | Kohzuki | C11D 3/43 |
| 2017/0267879 | A1* | 9/2017 | Kohzuki | C09D 11/10 |
| 2018/0170061 | A1* | 6/2018 | Nakamura | C09D 11/102 |
| 2018/0208783 | A1* | 7/2018 | Takahashi | B41J 29/17 |
| 2019/0270903 | A1* | 9/2019 | Kohzuki | B41J 2/16535 |
| 2020/0164650 | A1* | 5/2020 | Bannai | B41J 2/16552 |

FOREIGN PATENT DOCUMENTS

| | | |
|---|---|---|
| JP | 2013-56454 A | 3/2013 |
| JP | 5566741 B2 | 6/2014 |
| JP | 2018-21122 A | 2/2018 |
| JP | 2018-69723 A | 5/2018 |

OTHER PUBLICATIONS

Written Opinion dated Jan. 15, 2018 for counterpart International Patent Application No. PCT/JP2017/038261 filed Oct. 24, 2017.
Japanese Office Action dated May 11, 2021 in Japanese Patent Application No. 2017-181103, 10 pages.

* cited by examiner

CLEANING SOLUTION, SET OF INK AND CLEANING SOLUTION, CLEANING METHOD, CLEANING APPARATUS, PRINTING METHOD, AND PRINTING APPARATUS

TECHNICAL FIELD

The present disclosure relates to a cleaning solution, a set of an ink and a cleaning solution, a cleaning method, a cleaning apparatus, a printing method, and a printing apparatus.

BACKGROUND ART

Hitherto, dye inks have been the mainstream among inkjet inks owing to, for example, a good chromogenicity and a high reliability of the dye inks. Recently, however, it has become more common to use pigment inks, because the dye inks have disadvantages of being poor in water resistance and light resistance.

Inkjet printing using the pigment inks has come to be employed also in commercial printing using, for example, high-speed continuous feed printers. In such commercial printing, image qualities comparable to image qualities obtained by existing offset printing are needed also on lowly ink-absorbable coated print paper serving as print media.

It is preferable to add resins in inks in order to secure a high-speed drying property (high-speed fixability) and fixability on lowly ink-absorbable media, which the inks need to have in order to be used in the high-speed continuous feed printers.

However, because the inks containing the resins firmly adhere in the ink discharging heads, existing cleaning solutions are insufficient in cleaning power, and it is difficult to secure ink discharging reliability.

Hence, there is proposed an inkjet printer maintenance liquid containing at least one selected from the group consisting of glycol ethers and glycol esters in an amount of 80 percent by mass or greater of the maintenance liquid (see, for example PTL 1).

CITATION LIST

Patent Literature

[PTL 1] Japanese Patent No. 5566741

SUMMARY OF INVENTION

Technical Problem

The present disclosure has an object to provide a cleaning solution that can secure ink discharging reliability and is excellent in cleanability, storage stability, and mixing stability with an ink.

Solution to Problem

According to one aspect of the present disclosure, a cleaning solution contains water, a compound represented by general formula (1) below, a glycol ether compound, and a surfactant.

The glycol ether compound dissolves in an amount of greater than 5 g in 100 g of water having a temperature of 25 degrees C., and a proportion of the glycol ether compound is 1 percent by mass or greater but 30 percent by mass or less.

[Chem. 1]

General formula (1)

In general formula (1), $R^1$ represents an alkyl group containing 1 or more but 4 or less carbon atoms.

Advantageous Effects of Invention

The present disclosure can provide a cleaning solution that can secure ink discharging reliability and is excellent in cleanability, storage stability, and mixing stability with an ink.

DESCRIPTION OF EMBODIMENTS (Cleaning Solution)

A cleaning solution of the present disclosure contains water, a compound represented by general formula (1) below, a glycol ether compound, and a surfactant.

The glycol ether compound dissolves in an amount of greater than 5 g in 100 g of water having a temperature of 25 degrees C., and a proportion of the glycol ether compound is 1 percent by mass or greater but 30 percent by mass or less.

The cleaning solution further contains other components as needed.

[Chem. 2]

General formula (1)

In general formula (1), $R^1$ represents an alkyl group containing 1 or more but 4 or less carbon atoms.

The cleaning solution of the present disclosure is based on a finding that only by containing at least one selected from the group consisting of existing glycol ethers and existing glycol esters, a cleaning solution cannot obtain a sufficient cleanability and is also poor in storage stability and mixing stability with an ink.

The present inventors have found that combined use of the compound represented by general formula (1) and the glycol ether compound makes it possible to obtain a higher cleanability than obtained when these compounds are used alone. The present inventors have also found that combined use of the compound represented by general formula (1) and the glycol ether compound, the latter of which undergoes separation if used alone, makes it possible to obtain a sufficient storage stability.

Hence, the cleaning solution of the present disclosure contains water, a compound represented by general formula (1), a glycol ether compound, and a surfactant. The glycol ether compound dissolves in an amount of greater than 5 g in 100 g of water having a temperature of 25 degrees C., and a proportion of the glycol ether compound is 1 percent by mass or greater but 30 percent by mass or less.

<Compound Represented by General Formula (1)>

[Chem. 3]

General formula (1)

In general formula (1), $R^1$ represents an alkyl group containing 1 or more but 4 or less carbon atoms.

In general formula (1), $R^1$ represents an alkyl group containing 1 or more but 4 or less carbon atoms. Examples of the alkyl group containing 1 or more but 4 or less carbon atoms include a methyl group, an ethyl group, a propyl group, and a butyl group. Among these alkyl groups, a methyl group, an ethyl group, and a butyl group are preferable, and a methyl group and a t-butyl group are more preferable. Examples of the compound represented by general formula (1) include (3-methoxy-N,N-dimethyl propionamide) when $R^1$ in general formula (1) is a methyl group, and (3-butoxy-N,N-dimethyl propionamide) when $R^1$ in general formula (1) is a butyl group.

These compounds may be appropriately synthesized products or commercially available products. Examples of the commercially available products include 3-methoxy-N,N-dimethyl propionamide (EQUAMIDE M100, available from Idemitsu Kosan Co., Ltd.) and 3-butoxy-N,N-dimethyl propionamide (EQUAMIDE B100, available from Idemitsu Kosan Co. Ltd.).

3-Methoxy-N,N-dimethyl propionamide mentioned above can be synthesized by putting N,N-dimethyl acrylamide (19.828 g) and ethanol (19.868 g) in a 300 mL separable flask equipped with a stirrer, a thermocouple, and a nitrogen gas introducing tube, stirring the materials while introducing a nitrogen gas, adding sodium-methoxide (0.338 g) to allow the materials to undergo a reaction at 35 degrees C. for 4 hours, after completion of the reaction, adding phosphoric acid (150 mg) to homogenize the solution, leaving the resultant to stand for 3 hours, filtrating the obtained solution to remove a precipitate, and removing an unreacted matter with an evaporator.

3-Butoxy-N,N-dimethyl propionamide can be synthesized by putting N,N-dimethyl acrylamide (19.828 g) and ethanol (19.868 g) in a 300 mL separable flask equipped with a stirrer, a thermocouple, and a nitrogen gas introducing tube, stirring the materials while introducing a nitrogen gas, adding sodium butoxide (0.338 g) to allow the materials to undergo a reaction at 35 degrees C. for 4 hours, after completion of the reaction, adding phosphoric acid (150 mg) to homogenize the solution, leaving the resultant to stand for 3 hours, filtrating the obtained solution to remove a precipitate, and removing an unreacted matter with an evaporator.

The proportion of the compound represented by general formula (1) is preferably 10 percent by mass or greater but 60 percent by mass or less and more preferably 20 percent by mass or greater but 50 percent by mass or less of the total amount of the cleaning solution. When the proportion of the compound is 10 percent by mass or greater but 60 percent by mass or less, cleanability, discharging stability, and storage stability can be satisfied simultaneously.

<Glycol Ether Compound>

The glycol ether compound strongly acts on an ink film and can improve cleanability. When the compound represented by general formula (1) and the glycol ether compound are contained in combination, cleanability, discharging stability, and storage stability can be satisfied simultaneously.

The glycol ether compound is not particularly limited and can be suitably selected to suit to a particular application so long as the glycol ether compound dissolves in an amount of greater than 5 g in 100 g of water having a temperature of 25 degrees C. Examples of the glycol ether compound include ethylene glycol monobutyl ether, propylene glycol monomethyl ether, propylene glycol monobutyl ether, diethylene glycol monoethyl ether, diethylene glycol monobutyl ether, diethylene glycol methyl ethyl ether, dipropylene glycol monomethyl ether, dipropylene glycol monoethyl ether, propylene glycol-n-propyl ether, triethylene glycol monomethyl ether, triethylene glycol monoethyl ether, triethylene glycol monobutyl ether, tripropylene glycol monomethyl ether, and a dialkyl glycol ether compound represented by general formula (2) below. These glycol ether compounds can be used alone or in combination. Among these glycol ether compounds, the dialkyl glycol ether compound represented by general formula (2) below is particularly preferable because the dialkyl glycol ether compound can easily soften stains and improve cleanability even more.

[Chem. 4]

General formula (2)

In general formula (2), $R^2$ represents $C_nH_{2n+1}$ where n is from 1 through 4, $R^3$ represents a hydrogen atom or a methyl group, and m represents an integer of from 1 through 4.

Examples of the dialkyl glycol ether compound represented by general formula (2) include diethylene glycol dimethyl ether, diethylene glycol diethyl ether, diethylene glycol dibutyl ether, tetraethylene glycol dimethyl ether, and tetraethylene glycol diethyl ether.

The proportion of the glycol ether compound that dissolves in an amount of greater than 5 g in 100 g of water having a temperature of 25 degrees C. is 1 percent by mass or greater but 30 percent by mass or less and preferably 1 percent by mass or greater but 10 percent by mass or less of the total amount of the cleaning solution. When the proportion of the glycol ether compound is 1 percent by mass or greater but 30 percent by mass or less, cleanability, discharging stability, and storage stability can be satisfied simultaneously.

<Glycol Ether Compound that Dissolves in an Amount of 5 g or Less in 100 g of Water Having a Temperature of 25 Degrees C.>

It is preferable that the cleaning solution further contain a glycol ether compound that dissolves in an amount of 5 g or less in 100 g of water having a temperature of 25 degrees C.

The additional glycol ether compound that dissolves in an amount of 5 g or less in 100 g of water having a temperature of 25 degrees C. makes it possible to act also on hydrophobic stains, and to increase a force to act on stains of an ink film in which a resin proportion is high and improve cleanability.

Particularly, it is preferable to combine the glycol ether compound that dissolves in an amount of 5 g or less in 100 g of water having a temperature of 25 degrees C. with the dialkyl glycol ether compound represented by general formula (2), because an unexpected effect related to cleanability can be obtained.

Examples of the glycol ether compound that dissolves in an amount of 5 g or less in 100 g of water having a temperature of 25 degrees C. include dipropylene glycol-n-butyl ether, tripropylene glycol-n-butyl ether, and propylene glycol phenyl ether.

The proportion of the glycol ether compound that dissolves in an amount of 5 g or less in 100 g of water having a temperature of 25 degrees C. is preferably 1 percent by mass or greater but 20 percent by mass or less and more preferably 1 percent by mass or greater but 10 percent by mass or less of the total amount of the cleaning solution. When the proportion of the glycol ether compound is 1 percent by mass or greater, cleanability is improved. When the proportion of the glycol ether compound is 20 percent by mass or less, mixing stability with an ink is improved.

In the present disclosure, any other solvent than the compound represented by general formula (1) and the glycol ether compound may also be contained so long as the effect of the present disclosure is not spoiled.

The any other solvent is not particularly limited and can be suitably selected to suit to a particular application. Examples of the any other solvent include a water-soluble organic solvent.

The water-soluble organic solvent is not particularly limited and can be suitably selected to suit to a particular application. Examples of the water-soluble organic solvent include: polyols; nitrogen-containing heterocyclic compounds; amides; amines; sulfur-containing compounds; propylene carbonate; ethylene carbonate; and polyol compounds containing 8 or more carbon atoms. These water-soluble organic solvents can be used alone or in combination.

Examples of the polyols include ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the nitrogen-containing heterocyclic compounds include 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amides include formamide, N-methyl formamide, N,N-dimethyl formamide, 3-methoxy-N,N-dimethyl propionamide, and 3-butoxy-N,N-dimethyl propionamide.

Examples of the amines include monoethanolamine, diethanolamine, and triethylamine.

Examples of the sulfur-containing compounds include dimethyl sulfoxide, sulfolane, and thiodiethanol.

Examples of the polyol compounds containing 8 or more carbon atoms include 2-ethyl-1,3-hexanediol and 2,2,4-trimethyl-1,3-pentanediol.

<Surfactant>

As the surfactant, any of polyoxyalkylene surfactants, silicone-based surfactants, fluorosurfactants, amphoteric surfactants, nonionic surfactants, and anionic surfactants can be used. However, polyoxyalkylene surfactants and silicone-based surfactants are preferable. In terms of cleanability and storage stability, polyoxyalkylene surfactants are particularly preferable.

Examples of the polyoxyalkylene surfactants include polyoxyethylene distyrenated phenyl ether and polyoxyethylene polyoxypropylene alkyl ether.

The polyoxyalkylene surfactant may be an appropriately synthesized product or a commercially available product. Examples of the commercially available product include EMULGEN A-60 (polyoxyethylene distyrenated phenyl ether), EMULGEN LS-106 (polyoxyethylene polyoxypropylene alkyl ether), and EMULGEN LS-110 (polyoxyethylene polyoxypropylene alkyl ether) (all available from Kao Corporation, higher alcohol-based ether-based nonionic surfactants). These commercially available products can be used alone or in combination.

The silicone-based surfactant has no specific limit and can be suitably selected to suit to a particular application. Examples of the silicone-based surfactants include side-chain-modified polydimethylsiloxane, both end-modified polydimethylsiloxane, one-end-modified polydimethylsiloxane, and side-chain-both-end-modified polydimethylsiloxane. A polyether-modified silicone-based surfactant having a polyoxyethylene group or a polyoxyethylene polyoxypropylene group as a modifying group is particularly preferable because such an agent demonstrates good characteristics as an aqueous surfactant.

It is possible to use a polyether-modified silicone-based surfactant as the silicone-based surfactant. A specific example of the polyether-modified silicone-based surfactant is a compound in which a polyalkylene oxide structure is introduced into the side chain of the Si site of dimethyl siloxane.

Any suitably synthesized surfactant and any product of the surfactant available on the market is suitable. Products available on the market are obtained from, for example, Byk Chemie Japan Co., Ltd., Shin-Etsu Chemical Co., Ltd., Dow Corning Toray Silicone Co., Ltd., Nihon Emulsion Co., Ltd., and Kyoeisha Chemical Co., Ltd.

The polyether-modified silicone-based surfactant has no particular limit and can be suitably selected to suit to a particular application. Examples of the polyether-modified silicone-based surfactant include a compound in which the polyalkylene oxide structure represented by the following general formula (S-1) is introduced into the side chain of the Si site of dimethyl polysiloxane.

<General Formula (S-1)>

[Chem. 5]

$X = \text{—} R(C_2H_4O)_a (C_3H_6O)_b R'$

In general formula (S-1), m, n, a, and b each represent integers, R represents an alkylene group, and R' represents an alkyl group.

Products available on the market may be used as the polyether-modified silicone-based surfactants. Specific examples of the products available on the market include KF-618, KF-642, and KF-643 (all manufactured by Shin-Etsu Chemical Co., Ltd.), EMALEX-SS-5602 and SS-1906EX (both manufactured by Nihon Emulsion Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

As the fluorosurfactant, for example, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in a side chain are particularly preferable because these compounds do not foam easily. Examples of the perfluoroalkyl sulfonic acid compounds include perfluoroalkyl sulfonic acid and salts of perfluoroalkyl sulfonic acid. Examples of the perfluoroalkyl carboxylic acid compounds include perfluoroalkyl carboxylic acid and salts of perfluoroalkyl carboxylic acid. Examples of the polyoxyalkylene ether polymer compounds having a perfluoroalkyl ether group in a side chain include sulfuric acid ester salts of polyoxyalkylene ether polymer having a perfluoroalkyl ether group in a side chain and salts of polyoxyalkylene ether polymers having a perfluoroalkyl ether group in a side chain. Counter ions of salts in these fluorosurfactants are, for example, Li, Na, K, $NH_4$, $NH_3CH_2CH_2OH$, $NH_2(CH_2CH_2OH)_2$, and $NH(CH_2CH_2OH)_3$.

Examples of the amphoteric surfactants include lauryl aminopropionic acid salts, lauryl dimethyl betaine, stearyl dimethyl betaine, and lauryl dihydroxyethyl betaine. Examples of the nonionic surfactants include polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Examples of the anionic surfactants include polyoxyethylene alkyl ether acetates, dodecyl benzene sulfonates, laurates, and polyoxyethylene alkyl ether sulfates. These surfactants can be used alone or in combination.

The proportion of the surfactant is not particularly limited and can be suitably selected to suit to a particular application. The proportion is preferably 0.001 percent by mass or greater but 5 percent by mass or less, more preferably 0.05 percent by mass or greater but 5 percent by mass or less, and yet more preferably 0.1 percent by mass or greater but 3 percent by mass or less in terms of excellent wettability and discharging stability and improvement on image quality.

<Water>

The proportion of the water is not particularly limited, can be suitably selected to suit to a particular application, and is preferably 10 percent by mass or greater but 80 percent by mass or less, more preferably 10 percent by mass or greater but 60 percent by mass or less, and particularly preferably 10 percent by mass or greater but 59 percent by mass or less of the total amount of the cleaning solution. When the proportion of the water is 10 percent by mass or greater, ink stains can be cleanly wiped off from an interface of a nozzle surface, to make it possible to obtain a sufficient discharging reliability. When the proportion of the water is 80 percent by mass or less, stains can be sufficiently swelled. Furthermore, addition of the water enables elimination of a flash point.

<Other Components>

The other components are not particularly limited and can be suitably selected to suit to a particular application. Examples of the other components include a defoaming agent, preservatives and fungicides, a corrosion inhibitor, and a pH regulator.

<Defoaming Agent>

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The cleaning solution of the present disclosure is used when wiping a nozzle surface of an ink discharging head of an ink discharging apparatus. As the method for using the cleaning solution, it is possible to use the cleaning solution by impregnating a wiping member with the cleaning solution, or to blow a nozzle surface with the cleaning solution and then wipe the nozzle surface with a wiping member.

As an ink to be used together with the cleaning solution, an ink included in a set of an ink and a cleaning solution described below is preferable for use. It is preferable that the cleaning solution be for ink jetting.

(Set of Ink and Cleaning Solution)

A set of an ink and a cleaning solution of the present disclosure includes; an ink containing resin particles; and a cleaning solution containing water, a compound represented by general formula (1) below, a glycol ether compound, and a surfactant.

The glycol ether compound dissolves in an amount of greater than 5 g in 100 g of water having a temperature of 25 degrees C., and a proportion of the glycol ether compound is 1 percent by mass or greater but 30 percent by mass or less of the total amount of the cleaning solution.

General formula (1)

In general formula (1), $R^1$ represents an alkyl group containing 1 or more but 4 or less carbon atoms.

As the cleaning solution, the cleaning solution of the present disclosure can be used.

When the ink contains resin particles, the ink can be improved in fixability on a print medium, but becomes less able to maintain ink discharging reliability. Therefore, it is preferable to use the ink as a set including the cleaning solution of the present disclosure.

It is preferable that the ink be for ink jetting.

As the ink, an ink described below can be used.

<Ink>

The ink contains resin particles, preferably contains an organic solvent and a coloring material, and further contains additives as needed.

<Resin>

The kind of the resin to be contained in the ink is not particularly limited and can be suitably selected to suit to a particular application. Examples of the resin include urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. These resins can be used alone or in combination. Among these resins, urethane resins are preferable.

Resin particles formed of these resins may be used. An ink can be obtained by mixing with materials such as a coloring material and an organic solvent, the resin particles that are in a resin emulsion state of being dispersed in water serving as a dispersion medium.

The volume average particle diameter of the resin particles is not particularly limited and can be suitably selected to suit to a particular application. The volume average particle diameter is preferably from 10 through 1,000 nm, more preferably from 10 through 200 nm, and furthermore preferably from 10 through 100 nm to obtain good fixability and image hardness.

The volume average particle diameter can be measured by using a particle size analyzer (NANOTRAC WAVE-UT151, manufactured by MicrotracBEL Corp.).

The proportion of the resin is not particularly limited and can be suitably selected to suit to a particular application. In terms of fixability and storage stability of ink, it is preferably from 1 through 30 percent by mass and more preferably from 5 through 20 percent by mass to the total content of the ink.

<Organic Solvent>

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application. In terms of the drying property and discharging reliability of the ink, the proportion is preferably from 10 through 60 percent by mass and more preferably from 20 through 60 percent by mass.

<Water>

The proportion of water in the ink has no particular limit and can be suitably selected to suit to a particular application. In terms of the drying property and discharging reliability of the ink, the proportion is preferably from 10 through 90 percent by mass and more preferably from 20 through 60 percent by mass.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36. The type of dye is not particularly limited and includes, for example, acidic dyes, direct dyes, reactive dyes, and basic dyes. These can be used alone or in combination. Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 through 15 percent by mass and more preferably from 1 through 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by micro-capsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, amphoteric surfactants, nonionic surfactants, etc. depending on the pigments. Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 through 500 nm and more preferably from 20 through 150 nm to improve dispersion stability of the pigment and ameliorate the discharging stability and image quality such as image density. The particle diameter of the pigment can be measured using a particle size analyzer (NANOTRAC WAVE-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 through 50 percent by mass and more preferably from 0.1 through 30 percent by mass.

During the production, coarse particles are optionally filtered off from the pigment dispersion with a filter, a centrifuge, etc. preferably followed by degassing.

The particle diameter of the solid portion in ink has no particular limit and can be suitably selected to suit to a particular application. For example, the maximum frequency in the maximum number conversion is preferably from 20 through 1,000 nm and more preferably from 20 through 150 nm to ameliorate the discharging stability and image quality such as image density. The solid portion includes resin particles, particles of pigments, etc. The particle diameter of the solid portion can be measured by using a particle size analyzer (NANOTRAC WAVE-UT151, manufactured by MicrotracBEL Corp).

<Additive>

Ink may further optionally contain a surfactant, a defoaming agent, a preservative and fungicide, a corrosion inhibitor, a pH regulator, etc.

As the surfactant, the defoaming agent, the preservative and fungicide, the corrosion inhibitor, and the pH regulator, the same as used in the cleaning solution can be used.

The property of the ink is not particularly limited and can be suitably selected to suit to a particular application. For example, viscosity, pH, etc., are preferably in the following ranges.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The pH of the ink is preferably from 7 through 12 and more preferably from 8 through 11 in terms of prevention of corrosion of metal materials contacting the ink.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of vinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper, floor material, and tiles, cloth for apparel such as T-shirts, textile, and leather as the print medium. In addition, the configuration of the paths through which the print medium is conveyed can be adjusted to accommodate ceramics, glass, metal, etc.

<Stored Container>

A stored container used in the present disclosure includes the cleaning solution of the present disclosure or at least any one of the cleaning solution and the ink in the set of an ink and a cleaning solution of the present disclosure, and a container in which the cleaning solution or at least any one of the cleaning solution and the ink is stored. The stored container further includes other members as needed.

The container is not particularly limited. For example, the shape, structure, size, and material of the container can be suitably selected to suit to a particular application. Examples of the container include a container including at least an ink bag formed of, for example, aluminum laminate film and resin film.

(Cleaning Method and Cleaning Apparatus)

A cleaning method of the present disclosure includes a step of applying a cleaning solution to a wiping member (hereinafter may be referred to as "cleaning solution applying step") and a step of performing wiping with the wiping member to which the cleaning solution is applied (hereinafter may be referred to as "wiping step"), and further includes other steps as needed.

As the cleaning solution, the cleaning solution of the present disclosure, or the cleaning solution in the set of an ink and a cleaning solution of the present disclosure is used.

It is preferable that the cleaning method be a cleaning method for cleaning a nozzle surface of an ink discharging head.

A cleaning apparatus of the present disclosure includes a unit configured to apply a cleaning solution to a wiping member (hereinafter may be referred to as "cleaning solution applying unit") and a unit configured to perform wiping with the wiping member to which the cleaning solution is applied (hereinafter may be referred to as "wiping unit"), and further includes other units as needed.

The cleaning solution is the cleaning solution of the present disclosure or the cleaning solution in the set of an ink and a cleaning solution of the present disclosure.

It is preferable that the cleaning apparatus be a cleaning apparatus configured to clean a nozzle surface of an ink discharging head.

<Cleaning Solution Applying Step and Cleaning Solution Applying Unit>

The cleaning solution applying step is a step of applying a cleaning solution to a wiping member, and, for example, is a step of applying a cleaning solution to a wiping member on a pressing member.

The cleaning solution applying unit is a unit configured to apply a cleaning solution to a wiping member, and, for example, is a unit configured to apply a cleaning solution to a wiping member on a pressing member.

The cleaning solution applying step can be favorably performed by the cleaning solution applying unit.

It is preferable to control the amount of the cleaning solution to be applied based on a printing time (a discharging time). In this case, it is more preferable to select the amount of the cleaning solution to be applied from a plurality of setting values. Examples of the plurality of setting values include manners for applying the cleaning solution (for example, "pressure", "number of times of application", and "number of applying nozzles").

It is preferable to control the amount of the cleaning solution to be applied base on the pressure to be applied to a cleaning solution applying nozzle serving as the cleaning solution applying unit. Further, in the case of applying the cleaning solution from a plurality of cleaning solution applying nozzles, it is preferable to control the amount of the cleaning solution to be applied to the wiping member based on the number of cleaning solution applying nozzles. Furthermore, it is preferable to control the amount of the cleaning solution to be applied to the wiping member based on the number of times of applying the cleaning solution from the cleaning solution applying nozzle.

<Wiping Step and Wiping Unit>

The wiping step is a step of performing wiping with the wiping member to which the cleaning solution is applied.

The wiping unit is a unit configured to perform wiping with the wiping member to which the cleaning solution is applied.

It is preferable that a nozzle surface be wiped in the wiping step and by the wiping unit.

The wiping step can be favorably performed by the wiping unit.

The method for wiping the nozzle surface with the wiping member to which the cleaning solution is applied is not particularly limited and can be suitably selected to suit to a particular application. Examples of the method include a method of pressing non-woven fabric to which the cleaning solution is applied and that serves as the wiping member on the nozzle surface of the ink discharging head with a pressing roller serving as the pressing member.

<Other Steps and Other Units>

Examples of the other steps and the other units include a controlling step and a controlling unit.

Examples of the controlling unit include devices such as a sequencer and a computer.

Figure 3:
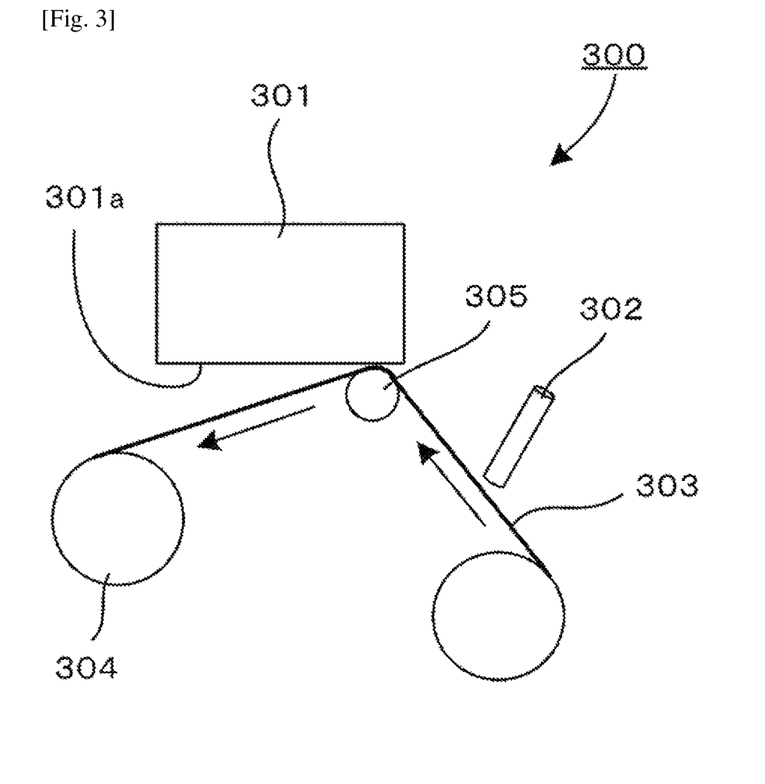
FIG. 3 is a schematic view illustrating an example of a cleaning apparatus of the present disclosure.

FIG. 3 is a schematic view illustrating an example of the cleaning apparatus of the present disclosure. A cleaning apparatus 300 illustrated in FIG. 3 is an apparatus configured to clean a nozzle surface 301a of a nozzle plate 301 of an ink discharging head, the nozzle surface 301a being at an ink discharging side.

The cleaning apparatus 300 includes non-woven fabric 303 serving as the wiping member, a cleaning solution applying nozzle 302 serving as the cleaning solution applying unit, a pressing roller 305 serving as the pressing member, and a takeup roller 304 configured to take up the non-woven fabric having undergone the wiping process.

The cleaning solution is supplied from a cleaning solution tank through an unillustrated cleaning solution supplying tube. With actuation of a pump provided halfway through the cleaning solution supplying tube, the cleaning solution is applied to the non-woven fabric 303 serving as the wiping member from the cleaning solution applying nozzle 302 in a cleaning solution applying amount corresponding to a printing time. The non-woven fabric 303 is wound up in a roll form.

As illustrated in FIG. 3, the non-woven fabric 303 to which the cleaning solution is applied is brought into contact with and pressed on the nozzle surface 301a of the ink discharging head 301 by the pressing roller 305 serving as the pressing member, to clean the nozzle surface 301a. After the wiping process is completed, the non-woven fabric 303 is taken up by the takeup roller 304.

It is possible to provide a plurality of cleaning solution applying nozzles 302 as the cleaning solution applying unit. A pressure is applicable to the cleaning solution applying unit based on control by the controlling unit (unillustrated), and it is possible to adjust the amount of the cleaning solution to be applied by appropriately changing the pressure. It is also possible to adjust the amount of the cleaning solution to be applied by changing the number of nozzles from which the cleaning solution is applied based on control by the controlling unit (unillustrated). It is also possible to adjust the amount of the cleaning solution to be applied by changing the number of times of applying the cleaning solution based on control by the controlling unit (unillustrated).

As the method for cleaning the nozzle surface of the ink discharging head at the ink discharging side, there is the following embodiment.

During application of the cleaning solution, a pressure is applicable to the cleaning solution applying nozzles, and it is possible to adjust the amount of the cleaning solution to be applied to a desired amount by changing the pressure. It is also possible to adjust the amount of the cleaning solution to be applied by changing the number of nozzles from which the cleaning solution is applied among the plurality of cleaning solution applying nozzles. It is also possible to adjust the amount of the cleaning solution to be applied by changing the number of times of applying the cleaning solution from the cleaning solution applying nozzles. In this way, it is possible to wipe the nozzle surface that has finished printing, with the wiping member to which the cleaning solution is applied.

(Printing Method and Printing Apparatus)

A printing method of the present disclosure is a printing method including a discharging step of discharging an ink from a nozzle of an ink discharging head and a cleaning step of cleaning a nozzle surface of the ink discharging head, wherein the cleaning step includes a step of applying a cleaning solution to a wiping member and a step of wiping the nozzle surface with the wiping member to which the cleaning solution is applied, and wherein the cleaning solution and the ink in the set of an ink and a cleaning solution of the present disclosure are used as the cleaning solution and the ink. The printing method further includes other steps as needed.

The printing method is favorably used for inkjet printing.

A printing apparatus of the present disclosure is a printing apparatus including a discharging unit configured to discharge an ink from a nozzle of an ink discharging head and a cleaning apparatus configured to clean a nozzle surface of the ink discharging head, wherein the cleaning apparatus includes a unit configured to apply a cleaning solution to a wiping member and a unit configured to wipe the nozzle surface with the wiping member to which the cleaning solution is applied, and wherein the cleaning solution and the ink in the set of an ink and a cleaning solution of the present disclosure are used as the cleaning solution and the ink. The printing apparatus further includes other units as needed.

<Printing Apparatus and Printing Method>

The ink of the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing apparatus and the printing method represent an apparatus capable of discharging ink, various processing fluids, etc. to a print medium and a method printing an image on the print medium using the apparatus. The print medium means an article to which the ink or the various processing fluids can be attached at least temporarily.

The printing apparatus may further optionally include a device relating to feeding, conveying, and ejecting the print medium and other devices referred to as a pre-processing device, a post-processing device, etc. in addition to the head portion to discharge the ink.

The printing apparatus and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing apparatus and the printing method are not limited to those producing merely meaningful visible images such as texts and figures with the ink. For example, the printing apparatus and the printing method can produce patterns like geometric design and 3D images.

In addition, the printing apparatus includes both a serial type apparatus in which the discharging head is caused to move and a line type apparatus in which the discharging head is not moved, unless otherwise specified.

Figure 1:
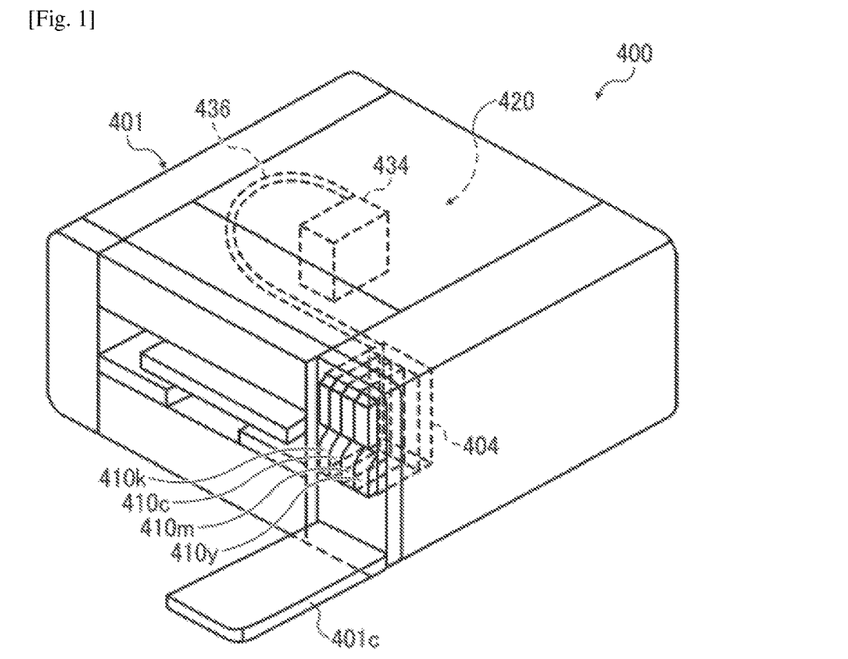
FIG. 1 is a perspective view illustrating an example of a serial-type image forming apparatus.
Figure 2:
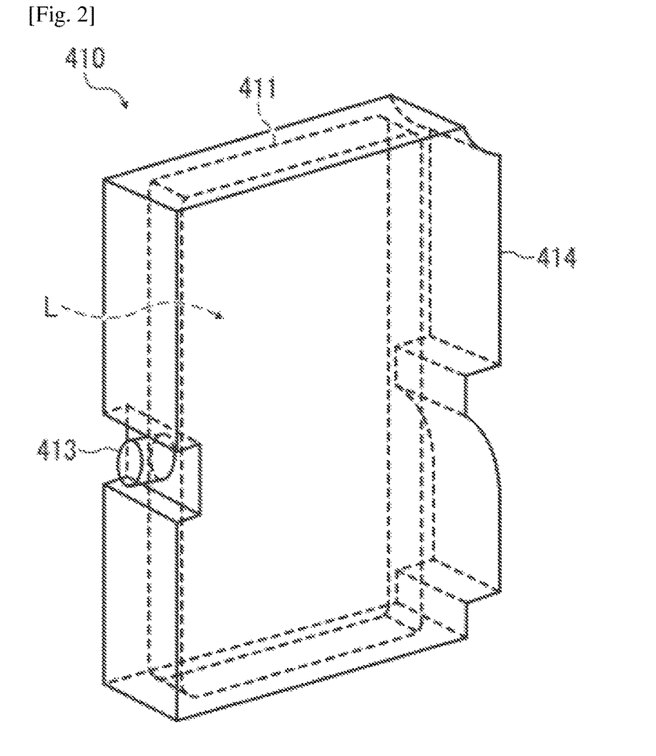
FIG. 2 is a perspective view illustrating an example of a main tank of the apparatus of FIG. 1.

Furthermore, in addition to the desktop type, this printing apparatus includes a wide type capable of printing images on a large print medium such as A0, a continuous printer capable of using continuous paper wound up in a roll form as print media. The printing apparatus of the present disclosure is described using an example with reference to FIG. 1 and FIG. 2. FIG. 1 is a perspective view illustrating the printing apparatus. FIG. 2 is a perspective view illustrating the main tank. An image forming apparatus 400 as an example of the printing apparatus is a serial type image forming apparatus. A mechanical unit 420 is disposed in an exterior 401 of the image forming apparatus 400. Each ink accommodating unit 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in a plastic housing case 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing apparatus may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

Moreover, image forming, recording, printing, etc. in the present disclosure represent the same meaning.

EXAMPLES

The present disclosure will be described below by way of Examples. The present disclosure should not be construed as being limited to these Examples.

Ink Production Example 1

—Preparation of White Pigment Dispersion—

In a beaker, polyoxyethylene styrenated phenyl ether (NEUGEN EA-177, available from DKS Co., Ltd., HLB=15.6, solid content: 100 percent by mass) (5 g) was dissolved in highly pure water (200.0 g). To the resultant, particles of an organic white pigment, which was an alkylene bismelamine compound (SHIGENOX OWP, available from Hakkol Chemical Co., Ltd.) (50.0 g) were added. The resultant was stirred with EXCEL AUTO HOMOGENIZER available from Nissei Corporation at 5,000 rpm for 30 minutes until dispersed to a state including no blocks. With the rotation number gradually increased, the resultant was stirred at 10,000 rpm for 30 minutes.

The obtained organic white pigment particle dispersion liquid was treated with an ultrasonic homogenizer (US-300T, available from Nissei Corporation, a chip diameter: 26 mm) at 200 microampere for 1 hour under water cooling.

The obtained organic white pigment particle dispersion liquid was treated with DYNO-MIL MULTILAB-TYPE DISPERSER available from Shinmaru Enterprises Corporation packed with zirconia beads having a diameter of 2 mm as media at a beads packing ratio of 70 percent by volume, at a stirring blade peripheral velocity of 8 m/s, batch-wise, for 30 minutes. Subsequently, the resultant was subjected to dispersion treatment with NANOMAKER (available from Advanced Nano Technology Co., Ltd.) at a pressure of 100 MPa for 20 passes.

Next, the resultant was filtrated through a membrane filter (a cellulose acetate film) having an average pore diameter of 5 micrometers, to obtain an organic white pigment particle dispersion in which the proportion of the organic white pigment particles was 19.6 percent by mass.

—Preparation of Ink 1—

Next, to the resultant, 1,3-butanediol (15.0 percent by mass), 1,2-propanediol (15.0 percent by mass), an acrylic resin emulsion (product name: BONCOAT R-3380-E, available from DIC Corporation, solid content: 45 percent by mass) (6.7 percent by mass, solid content equivalent), and a fluorosurfactant (product name: ZONYL (registered trademark) FSO-100, available from Du Pont K.K.) (1.0 percent by mass) were added, and then stirred and mixed. Subsequently, to the resultant, ion-exchanged water was added as a balance such that the organic white pigment particle dispersion would be 20.0 percent by mass and the total would be 100 percent by mass, and the resultant was stirred for 1 hour.

Next, the resultant was subjected to pressure filtration through a polypropylene filter having an average pore diameter of 1.5 micrometers to remove coarse particles, to prepare an ink 1.

TABLE 1

| Component (percent by mass) | | Ink 1 |
| --- | --- | --- |
| Organic solvent | 1,3-butanediol | 15.0 |
| | 1,2-propanediol | 15.0 |
| Resin | Acrylic resin emulsion | 6.7 |
| Pigment dispersion | Organic white pigment particle dispersion | 20.0 |
| Surfactant | FSO-100 | 1.0 |
| Water | Ion-exchanged water | Balance |
| Total (percent by mass) | | 100 |

In Table 1, the proportion of the acrylic resin emulsion was a solid content equivalent value.

The product names and supplier names of the components in Table 1 are as follows.

1,3-Butanediol: available from Tokyo Chemical Industry Co., Ltd.

1,2-Propanediol: available from Mitsui Chemicals, Inc.

Acrylic resin emulsion: available from DIC Corporation, product name: BONCOAT R-3380-E, solid content: 45 percent by mass Surfactant: available from Du Pont K.K., product name: ZONYL (registered trademark) FSO-100

(Preparation Example of Ink 2)

As an ink 2, "LX101 LATEX INK CARTRIDGE WHITE" available from MIMAKI Engineering Co., Ltd. (product number: LX100-W-22) was prepared.

Examples 1 to 20 and Comparative Examples 1 to 5

—Production of Cleaning Solutions 1 to 25—

According to the compositions and proportions in Table 2 to Table 7 below, the components were mixed, to prepare cleaning solutions 1 to 25.

TABLE 2

| | Component (percent by mass) | | Ex. 1 | Ex. 2 | Ex. 3 | Ex. 4 | Ex. 5 |
|---|---|---|---|---|---|---|---|
| | Cleaning solution No. | | 1 | 2 | 3 | 4 | 5 |
| Solvent | Compound of general formula (1) | $R^1$ = methyl group | 50 | — | 50 | 50 | 50 |
| | | $R^1$ = butyl group | — | 50 | — | — | — |
| | Glycol ether compound that dissolves in amount of greater than 5 g in 100 g of water of 25 degrees C. | Dipropylene glycol monomethyl ether | 8 | 8 | 30 | 20 | — |
| | | Tripropylene glycol monomethyl ether | — | — | — | — | 8 |
| | | Triethylene glycol monomethyl ether | — | — | — | — | — |
| | | Diethylene glycol diethyl ether | — | — | — | — | — |
| | | Diethylene glycol dibutyl ether | — | — | — | — | — |
| | Glycol ether compound that dissolves in amount of 5 g or less in 100 g of water of 25 degrees C. | Dipropylene glycol-n-butyl ether | — | — | — | — | — |
| | | Tripropylene glycol-n-butyl ether | — | — | — | — | — |
| Surfactant | Silicone-based surfactant | WET-240 | 1 | 1 | 1 | 1 | 1 |
| | | BYK-349 | — | — | — | — | — |
| | Polyoxyalkylene surfactant | A-60 | — | — | — | — | — |
| | | LS-106 | — | — | — | — | — |
| | | LS-110 | — | — | — | — | — |
| Water | Ion-exchanged water | | Balance | Balance | Balance | Balance | Balance |
| | Total (percent by mass) | | 100 | 100 | 100 | 100 | 100 |

TABLE 3

| | Component (percent by mass) | | Ex. 6 | Ex. 7 | Ex. 8 | Ex. 9 | Ex. 10 |
|---|---|---|---|---|---|---|---|
| | Cleaning solution No. | | 6 | 7 | 8 | 9 | 10 |
| Solvent | Compound of general formula (1) | $R^1$ = methyl group | 50 | 50 | 50 | 50 | 50 |
| | | $R^1$ = butyl group | — | — | — | — | — |
| | Glycol ether compound that dissolves in amount of greater than 5 g in 100 g of water of 25 degrees C. | Dipropylene glycol monomethyl ether | — | 1 | 10 | — | — |
| | | Tripropylene glycol monomethyl ether | — | — | — | — | — |
| | | Triethylene glycol monomethyl ether | 8 | — | — | — | — |
| | | Diethylene glycol diethyl ether | — | — | — | 10 | — |
| | | Diethylene glycol dibutyl ether | — | — | — | — | 10 |
| | Glycol ether compound that dissolves in amount of 5 g or less in 100 g of water of 25 degrees C. | Dipropylene glycol-n-butyl ether | — | — | — | — | — |
| | | Tripropylene glycol-n-butyl ether | — | — | — | — | — |
| Surfactant | Silicone-based surfactant | WET-240 | 1 | 1 | — | 1 | 1 |
| | | BYK-349 | — | — | 1 | — | — |
| | Polyoxyalkylene surfactant | A-60 | — | — | — | — | — |
| | | LS-106 | — | — | — | — | — |
| | | LS-110 | — | — | — | — | — |
| Water | Ion-exchanged water | | Balance | Balance | Balance | Balance | Balance |
| | Total (percent by mass) | | 100 | 100 | 100 | 100 | 100 |

TABLE 4

| Component (percent by mass) | | | Ex. 11 | Ex. 12 | Ex. 13 | Ex. 14 | Ex. 15 |
|---|---|---|---|---|---|---|---|
| | Cleaning solution No. | | 11 | 12 | 13 | 14 | 15 |
| Solvent | Compound of general formula (1) | R¹ = methyl group | 50 | 50 | 50 | 50 | 20 |
| | | R¹ = butyl group | — | — | — | — | — |
| | Glycol ether compound that dissolves in amount of greater than 5 g in 100 g of water of 25 degrees C. | Dipropylene glycol monomethyl ether | — | — | 8 | — | — |
| | | Tripropylene glycol monomethyl ether | — | — | — | — | — |
| | | Triethylene glycol monomethyl ether | — | — | — | — | — |
| | | Diethylene glycol diethyl ether | 10 | 10 | — | 10 | 10 |
| | | Diethylene glycol dibutyl ether | — | — | — | — | — |
| | Glycol ether compound that dissolves in amount of 5 g or less in 100 g of water of 25 degrees C. | Dipropylene glycol-n-butyl ether | 10 | 20 | 10 | — | 10 |
| | | Tripropylene glycol-n-butyl ether | — | — | — | 10 | — |
| Surfactant | Silicone-based surfactant | WET-240 | 1 | 1 | 1 | 1 | — |
| | | BYK-349 | — | — | — | — | — |
| | Polyoxyalkylene surfactant | A-60 | — | — | — | — | 1 |
| | | LS-106 | — | — | — | — | — |
| | | LS-110 | — | — | — | — | — |
| Water | | Ion-exchanged water | Balance | Balance | Balance | Balance | Balance |
| | Total (percent by mass) | | 100 | 100 | 100 | 100 | 100 |

TABLE 5

| Component (percent by mass) | | | Ex. 16 | Ex. 17 | Ex. 18 | Ex. 19 | Ex. 20 |
|---|---|---|---|---|---|---|---|
| | Cleaning solution No. | | 16 | 17 | 18 | 19 | 20 |
| Solvent | Compound of general formula (1) | R¹ = methyl group | 40 | 50 | 40 | 59 | 60 |
| | | R¹ = butyl group | — | — | — | — | — |
| | Glycol ether compound that dissolves in amount of greater than 5 g in 100 g of water of 25 degrees C. | Dipropylene glycol monomethyl ether | — | — | — | — | — |
| | | Tripropylene glycol monomethyl ether | — | — | — | — | — |
| | | Triethylene glycol monomethyl ether | — | — | — | — | — |
| | | Diethylene glycol diethyl ether | 10 | 10 | 10 | 10 | 10 |
| | | Diethylene glycol dibutyl ether | — | — | — | — | — |
| | Glycol ether compound that dissolves in amount of 5 g or less in 100 g of water of 25 degrees C. | Dipropylene glycol-n-butyl ether | 10 | 10 | 30 | 20 | 20 |
| | | Tripropylene glycol-n-butyl ether | — | — | — | — | — |
| Surfactant | Silicone-based surfactant | WET-240 | — | — | 1 | 1 | 1 |
| | | BYK-349 | — | — | — | — | — |
| | Polyoxyalkylene surfactant | A-60 | — | — | — | — | — |
| | | LS-106 | 1 | — | — | — | — |
| | | LS-110 | — | 1 | — | — | — |
| Water | | Ion-exchanged water | Balance | Balance | Balance | Balance | Balance |
| | Total (percent by mass) | | 100 | 100 | 100 | 100 | 100 |

TABLE 6

| Component (percent by mass) | | | Comp. Ex. 1 | Comp. Ex. 2 | Comp. Ex. 3 |
|---|---|---|---|---|---|
| | Cleaning solution No. | | 21 | 22 | 23 |
| Solvent | Compound of general formula (1) | R¹ = methyl group | — | 50 | 50 |
| | | R¹ = butyl group | — | — | — |
| | Glycol ether compound that dissolves in amount of greater than 5 g in 100 g of water of | Dipropylene glycol monomethyl ether | 10 | — | 31 |
| | | Tripropylene glycol monomethyl ether | — | — | — |
| | | Triethylene glycol monomethyl ether | — | — | — |

TABLE 6-continued

| Component (percent by mass) | | | Comp. Ex. 1 | Comp. Ex. 2 | Comp. Ex. 3 |
|---|---|---|---|---|---|
| | 25 degrees C. | Diethylene glycol diethyl ether | — | — | — |
| | | Diethylene glycol dibutyl ether | — | — | — |
| | Glycol ether compound that dissolves in amount of 5 g or less in 100 g of water of 25 degrees C. | Dipropylene glycol-n-butyl ether | — | — | — |
| | | Tripropylene glycol-n-butyl ether | — | — | — |
| Surfactant | Silicone-based surfactant | WET-240 | 1 | 1 | 1 |
| | | BYK-349 | — | — | — |
| | Polyoxyalkylene surfactant | A-60 | — | — | — |
| | | LS-106 | — | — | — |
| | | LS-110 | — | — | — |
| Water | Ion-exchanged water | | Balance | Balance | Balance |
| | Total (percent by mass) | | 100 | 100 | 100 |

TABLE 7

| Component (percent by mass) | | | Comp. Ex. 4 | Comp. Ex. 5 |
|---|---|---|---|---|
| | Cleaning solution No. | | 24 | 25 |
| Solvent | Compound of general formula (1) | $R^1$ = methyl group | 50 | 50 |
| | | $R^1$ = butyl group | — | — |
| | Glycol ether compound that dissolves in amount of greater than 5 g in 100 g of water of 25 degrees C. | Dipropylene glycol monomethyl ether | 8 | 0.4 |
| | | Tripropylene glycol monomethyl ether | — | — |
| | | Triethylene glycol monomethyl ether | — | — |
| | | Diethylene glycol diethyl ether | — | — |
| | | Diethylene glycol dibutyl ether | — | — |
| | Glycol ether compound that dissolves in amount of 5 g or less in 100 g of water of 25 degrees C. | Dipropylene glycol-n-butyl ether | — | — |
| | | Tripropylene glycol-n-butyl ether | — | — |
| Surfactant | Silicone-based surfactant | WET-240 | — | 1 |
| | | BYK-349 | — | — |
| | Polyoxyalkylene surfactant | A-60 | — | — |
| | | LS-106 | — | — |
| | | LS-110 | — | — |
| Water | Ion-exchanged water | | Balance | Balance |
| | Total (percent by mass) | | 100 | 100 |

The product names and supplier names of the components in Table 2 to Table 7 are as follows.

—Compound Represented by General Formula (1)—

$R^1$=methyl group (3-methoxy-N,N-dimethyl propionamide: EQUAMIDE); M100 (available from Idemitsu Kosan Co., Ltd.)

$R^1$=butyl group (3-butoxy-N,N-dimethyl propionamide: EQUAMIDE); EQUAMIDE B100 (available from Idemitsu Kosan Co., Ltd.)

<Glycol Ether Compound that Dissolves in an Amount of Greater than 5 g in 100 g of Water Having a Temperature of 25 Degrees C.>

Dipropylene glycol methyl ether (available from Tokyo Chemical Industry Co., Ltd.)

The amount dissolved in 100 g water at 25 degrees C. was greater than 5 g and in-finitely high.

Tripropylene glycol monomethyl ether (available from Tokyo Chemical Industry Co., Ltd.)

The amount dissolved in 100 g of water at 25 degrees C. was greater than 5 g and in-finitely high.

Triethylene glycol monomethyl ether (available from Tokyo Chemical Industry Co., Ltd.)

The amount dissolved in 100 g of water at 25 degrees C. was greater than 5 g and in-finitely high.

Diethylene glycol diethyl ether (available from Tokyo Chemical Industry Co., Ltd.)

The amount dissolved in 100 g of water at 25 degrees C. was greater than 5 g and in-finitely high.

Diethylene glycol dibutyl ether (available from Tokyo Chemical Industry Co., Ltd.)

The amount dissolved in 100 g of water at 25 degrees C. was greater than 5 g and in-finitely high.

Here, as the amount of the glycol ether compound dissolved in 100 g of water at 25 degrees C., an amount of the glycol ether compound to be added to water until the water became whitely turbid by mixing of the solvent dropwise was regarded as the maximum amount dissolved.

<Glycol Ether Compound that Dissolves in an Amount of 5 g or Less in 100 g of Water Having a Temperature of 25 Degrees C.>

Dipropylene glycol-n-butyl ether (available from Dow)

The amount dissolved in 100 g of water at 25 degrees C. was 5 g.

Tripropylene glycol-n-butyl ether (available from Dow)

The amount dissolved in 100 g of water at 25 degrees C. was 3 g.

Here, as the amount of the glycol ether compound dissolved in 100 g of water at 25 degrees C., an amount of the glycol ether compound to be added to water until the water became whitely turbid by mixing of the solvent dropwise was regarded as the maximum amount dissolved.

<Surfactant>

—Silicone-Based Surfactant—

Available from Nissin Chemical Co., Ltd., product name: WET-240

Available from Byk-Chemie Japan Co., Ltd., product name: BYK-349

—Polyoxyalkylene Surfactant—

Available from Kao Corporation, product name: EMULGEN A-60 (polyoxyethylene distyrenated phenyl ether) (a higher alcohol-based ether-based nonionic surfactant)

Available from Kao Corporation, product name: EMULGEN LS-106 (polyoxyethylene polyoxypropylene alkyl ether) (a higher alcohol-based ether-based nonionic surfactant)

Available from Kao Corporation, product name: EMULGEN LS-110 (polyoxyethylene polyoxypropylene alkyl ether) (a higher alcohol-based ether-based nonionic surfactant)

Examples 21 to 41 and Comparative Examples 6 to 10

Storage stability of each of the obtained cleaning solutions was evaluated in the manner described below. The results are presented in Table 8 below.

<Storage Stability of Cleaning Solution>

Each of the cleaning solutions (20 mL) was poured in a 30 mL volume glass bottle (product name: LAB RUN SCREW TUBE BOTTLE No. 6, available from As One Corporation), hermetically sealed, and stored at 70 degrees C. for 1 week. Liquid separation after the storage was observed, to evaluate storage stability of the cleaning solution according to the evaluation criteria described below.

<Evaluation Criteria>

A: There was no liquid separation.

B: There was a slight liquid separation, which however was not problematic for practical use.

C: There was liquid separation.

Next, the cleaning solutions and the inks were combined as presented in Table 8 below, to make sets of an ink and a cleaning solution. Using these sets of an ink and a cleaning solution, discharging reliability and mixing stability with the ink were evaluated in the manners described below. The results are presented in Table 8 below.

<Discharging Reliability>

With the inkjet printing apparatus illustrated in FIG. 1, continuous discharging of the ink 1 or 2 for 45 minutes was performed to perform printing. Thirty minutes after the discharging was stopped, with the cleaning apparatus illustrated in FIG. 3, the nozzle surface of the ink discharging head was wiped with non-woven fabric (CLEAN WIPER ANTICON GOLD, polyester filament fiber, available from Harada Corporation) impregnated with 50 microliters of each cleaning solution. Subsequently, discharging of the ink 1 or 2 was performed again, to evaluate discharging reliability according to the evaluation criteria described below.

<Evaluation Criteria>

A: There was no discharging disorder or failure to discharge at all.

B: There was discharging disorder or failure to discharge at 5 or less nozzles, but the discharging disorder or failure to discharge was recovered soon.

C: There was discharging disorder or failure to discharge.

<Mixing Stability with Ink>

Using the ink 1 or 2, each cleaning solution (18 g) was poured to the ink (2 g) in a 30 mL volume glass bottle (product name: LAB RUN SCREW TUBE BOTTLE No. 6, available from As One Corporation), and mixed and stirred. After 1 week of storage at 50 degrees C., settling of the pigment was visually observed, and the change rate of the viscosity of the mixture liquid of the ink and the cleaning solution between before and after the storage was measured according to the mathematic formula described below, to perform evaluation according to the criteria described below. The viscosity was measured with a viscometer RE-80L, manufactured by TOKI SANGYO CO., LTD. The number of rotations during viscosity measurement was adjusted such that the torque would be constant in a range of from 40 percent through 80 percent.

$$\text{Viscosity change rate } (\%) = \frac{\text{viscosity of mixture liquid after storage} - \text{viscosity of mixture liquid before storage}}{\text{viscosity of mixture liquid before storage}} \times 100$$

<Evaluation Criteria>

A: There was no settling of the pigment, and the viscosity change rate was higher than −5 percent or lower than +5 percent.

B: There was no settling of the pigment, but the viscosity change rate was lower than or equal to −5 percent or higher than or equal to +5 percent.

C: Setting of the pigment was visually observed.

<Cleanability>

With the inkjet printing apparatus illustrated in FIG. 1, continuous discharging of the ink 1 or 2 for 45 minutes was performed to perform printing. Twelve hours after the discharging was stopped, with the cleaning apparatus illustrated in FIG. 3, the nozzle surface of the ink discharging head was wiped with non-woven fabric (CLEAN WIPER ANTICON GOLD, polyester filament fiber, available from Harada Corporation) impregnated with 50 microliters of each cleaning solution. Subsequently, cleanability was evaluated according to the evaluation criteria described below.

<Evaluation Criteria>

A: No ink stains were left unwiped at all.

B: Less than 10 percent of the ink stains were left unwiped, but there was none at about the nozzles.

C: Less than 10 percent of the ink stains were left unwiped, and the ink stains left unwiped were at about the nozzles.

D: Ten percent or more of the ink stains were left unwiped.

TABLE 8

|  | Cleaning solution No. | Ink No. | Storage stability of cleaning solution | Mixing stability with ink | Discharging reliability | Cleanability |
|---|---|---|---|---|---|---|
| Ex. 21 | 1 | 1 | A | A | B | C |
| Ex. 22 | 1 | 2 | A | A | B | C |
| Ex. 23 | 2 | 1 | A | A | B | C |
| Ex. 24 | 3 | 1 | B | A | B | C |
| Ex. 25 | 4 | 1 | A | A | B | C |
| Ex. 26 | 5 | 1 | A | A | B | C |
| Ex. 27 | 6 | 1 | A | A | B | C |
| Ex. 28 | 7 | 1 | A | A | B | C |
| Ex. 29 | 8 | 1 | A | A | B | C |
| Ex. 30 | 9 | 1 | A | A | B | B |
| Ex. 31 | 10 | 1 | A | A | B | B |
| Ex. 32 | 11 | 1 | A | A | A | B |
| Ex. 33 | 12 | 1 | A | A | A | B |
| Ex. 34 | 13 | 1 | A | A | B | B |

TABLE 8-continued

| | Cleaning solution No. | Ink No. | Storage stability of cleaning solution | Mixing stability with ink | Discharging reliability | Cleanability |
|---|---|---|---|---|---|---|
| Ex. 35 | 14 | 1 | A | A | A | B |
| Ex. 36 | 15 | 1 | A | A | A | A |
| Ex. 37 | 16 | 1 | A | A | A | A |
| Ex. 38 | 17 | 1 | A | A | A | A |
| Ex. 39 | 18 | 1 | B | B | A | B |
| Ex. 40 | 19 | 1 | A | A | A | B |
| Ex. 41 | 20 | 1 | A | A | B | B |
| Comp. Ex. 6 | 21 | 1 | A | C | C | D |
| Comp. Ex. 7 | 22 | 1 | A | A | C | D |
| Comp. Ex. 8 | 23 | 1 | C | A | B | C |
| Comp. Ex. 9 | 24 | 1 | A | A | C | D |
| Comp. Ex. 10 | 25 | 1 | A | A | C | D |

Aspects of the present disclosure are as follows, for example.

<1> A cleaning solution including:
water;
a compound represented by general formula (1) below;
a glycol ether compound; and
a surfactant,
wherein the glycol ether compound dissolves in an amount of greater than 5 g in 100 g of water having a temperature of 25 degrees C., and a proportion of the glycol ether compound is 1 percent by mass or greater but 30 percent by mass or less,

[Chem. 7]

General formula (1)
where in general formula (1), $R^1$ represents an alkyl group containing 1 or more but 4 or less carbon atoms.

<2> The cleaning solution according to <1>,
wherein in general formula (1), $R^1$ is an ethyl group or a butyl group.

<3> The cleaning solution according to <1> or <2>,
wherein the glycol ether compound contains a dialkyl glycol ether compound represented by general formula (2) below,

[Chem. 8]

General formula (2)
where in general formula (2), $R^2$ represents $C_nH_{2n+1}$ where n is from 1 through 4, $R^3$ represents a hydrogen atom or a methyl group, and m represents an integer of from 1 through 4.

<4> The cleaning solution according to any one of <1> to <3>, further including
a glycol ether compound that dissolves in an amount of 5 g or less in 100 g of water having a temperature of 25 degrees C.

<5> The cleaning solution according to any one of <1> to <4>,
wherein the surfactant is a polyoxyalkylene surfactant.

<6> The cleaning solution according to <5>,
wherein the polyoxyalkylene surfactant is at least one of polyoxyethylene distyrenated phenyl ether and polyoxyethylene polyoxypropylene alkyl ether.

<7> The cleaning solution according to any one of <1> to <6>,
wherein a proportion of the surfactant is 0.05 percent by mass or greater but 5 percent by mass or less.

<8> A set of an ink and a cleaning solution, the set including:
an ink; and
a cleaning solution,
wherein the ink includes resin particles,
wherein the cleaning solution includes:
water;
a compound represented by general formula (1) below;
a glycol ether compound; and
a surfactant; and
wherein the glycol ether compound dissolves in an amount of greater than 5 g in 100 g of water having a temperature of 25 degrees C., and a proportion of the glycol ether compound is 1 percent by mass or greater but 30 percent by mass or less of a total amount of the cleaning solution,

[Chem. 9]

General formula (1)
where in general formula (1), $R^1$ represents an alkyl group containing 1 or more but 4 or less carbon atoms.

<9> The set of an ink and a cleaning solution according to <8>,
wherein in general formula (1), $R^1$ is an ethyl group or a butyl group.

<10> The set of an ink and a cleaning solution according to <8> or <9>,
wherein the glycol ether compound contains a dialkyl glycol ether compound represented by general formula (2) below, General formula (2)

where in general formula (2), $R^2$ represents $C_nH_{2n+1}$ where n is from 1 through 4, $R^3$ represents a hydrogen atom or a methyl group, and m represents an integer of from 1 through 4.

<11> The set of an ink and a cleaning solution according to any one of <8> to <10>, wherein the cleaning solution further includes a glycol ether compound that dissolves in an amount of 5 g or less in 100 g of water having a temperature of 25 degrees C.

<12> The set of an ink and a cleaning solution according to any one of <8> to <11>, wherein the surfactant is a polyoxyalkylene surfactant.

<13> The set of an ink and a cleaning solution according to <12>, wherein the polyoxyalkylene surfactant is at least one of polyoxyethylene distyrenated phenyl ether and polyoxyethylene polyoxypropylene alkyl ether.

<14> The set of an ink and a cleaning solution according to any one of <8> to <13>, wherein a proportion of the surfactant is 0.05 percent by mass or greater but 5 percent by mass or less.

<15> A stored container including:

the cleaning solution according to any one of <1> to <7>, or at least any one of the cleaning solution and the ink in the set of an ink and a cleaning solution according to any one of <8> to <14>; and a container in which the cleaning solution, or at least any one of the cleaning solution and the ink is stored.

<16> A cleaning method including:

a step of applying a cleaning solution to a wiping member; and a step of performing wiping with the wiping member to which the cleaning solution is applied, wherein the cleaning solution according to any one of <1> to <7> is used as the cleaning solution.

<17> The cleaning method according to <16>, wherein the cleaning method is a cleaning method for cleaning a nozzle surface of an ink discharging head, and wherein the step of performing wiping with the wiping member includes wiping the nozzle surface with the wiping member.

<18> The cleaning method according to <16> or <17>, wherein the wiping member is non-woven fabric.

<19> A cleaning apparatus including:

a unit configured to apply a cleaning solution to a wiping member; and a unit configured to perform wiping with the wiping member to which the cleaning solution is applied, wherein the cleaning solution is the cleaning solution according to any one of <1> to <7>.

<20> The cleaning apparatus according to <19>, wherein the cleaning apparatus is a cleaning apparatus configured to clean a nozzle surface of an ink discharging head, and wherein the unit configured to perform wiping with the wiping member is configured to wipe the nozzle surface.

<21> The cleaning apparatus according to <19> to <20>, wherein the wiping member is non-woven fabric.

<22> A printing method including:

a discharging step of discharging an ink from a nozzle of an ink discharging head; and a cleaning step of cleaning a nozzle surface of the ink discharging head, wherein the cleaning step includes:

a step of applying a cleaning solution to a wiping member; and a step of wiping the nozzle surface with the wiping member to which the cleaning solution is applied, and wherein the cleaning solution and the ink in the set of an ink and a cleaning solution according to any one of <8> to <14> are used as the cleaning solution and the ink.

<23> A printing apparatus including:

a discharging unit configured to discharge an ink from a nozzle of an ink discharging head; and a cleaning apparatus configured to clean a nozzle surface of the ink discharging head, wherein the cleaning apparatus includes:

a unit configured to apply a cleaning solution to a wiping member; and a unit configured to wipe the nozzle surface with the wiping member to which the cleaning solution is applied, and wherein the cleaning solution and the ink are the cleaning solution and the ink in the set of an ink and a cleaning solution according to any one of <8> to <14>.

The cleaning solution according to any one of <1> to <7>, the set of an ink and a cleaning solution according to any one of <8> to <14>, the stored container according to <15>, the cleaning method according to any one of <16> to <18>, the cleaning apparatus according to any one of <19> to <21>, the printing method according to <22>, and the printing apparatus according to <23> can solve the various problems in the related art and can achieve the object of the present disclosure.

REFERENCE SIGNS LIST

400: image forming apparatus
401: exterior of image forming apparatus
401c: cover of main body
404: cartridge holder
410: main tank
410k, 410c, 410m, 410y: main tank for each color of black (K), cyan (C), magenta (M), and yellow (Y)
411: ink accommodating unit
413: ink discharging outlet
414: housing case
420: mechanical unit
434: discharging head
436: supplying tube

The invention claimed is:

1. A cleaning solution, consisting of:
water;
a compound represented by formula (1): below;

a glycol ether compound; and
a surfactant,
wherein:
the glycol ether compound dissolves in an amount of greater than 5 g in 100 g of water having a temperature of 25 degrees C.;
a proportion of the glycol ether compound is 1 percent by mass or greater but 30 percent by mass or less of a total amount of the cleaning solution; and
$R^1$ represents an alkyl group that comprises 1 or more but 4 or less carbon atoms,
wherein the compound represented by general formula (1) is present in an amount of 40 percent by mass or greater of a total amount of the cleaning solution, and
wherein the water is present in an amount of 10 percent to 60 percent by mass of a total amount of the cleaning solution.

2. The cleaning solution according to claim 1, wherein:
the glycol ether compound comprises a dialkyl glycol ether compound represented by formula (2):

(2)

$R^2$ represents $CnH_{2n+1}$ where n is from 1 through 4;
$R^3$ represents a hydrogen atom or a methyl group; and
m represents an integer of from 1 through 4.

3. The cleaning solution according to claim 1, further consisting of:
a glycol ether compound that dissolves in an amount of 5 g or less in 100 g of water having a temperature of 25 degrees C.

4. The cleaning solution according to claim 1, wherein the surfactant comprises a polyoxyalkylene surfactant.

5. A cleaning method, comprising:
applying the cleaning solution of claim 1 to a wiping member; and
performing wiping with the wiping member to which the cleaning solution is applied.

6. The cleaning method according to claim 5, wherein:
the cleaning method is a cleaning method for cleaning a nozzle surface of an ink discharging head; and
the performing wiping with the wiping member comprises wiping the nozzle surface with the wiping member.

7. A cleaning apparatus, comprising:
a unit comprising the cleaning solution of claim 1 and configured to apply the cleaning solution to a wiping member; and
a unit configured to perform wiping with the wiping member to which the cleaning solution is applied.

8. The cleaning apparatus according to claim 7,
wherein the cleaning apparatus is a cleaning apparatus configured to clean a nozzle surface of an ink discharging head, and
wherein the unit configured to perform wiping with the wiping member is configured to wipe the nozzle surface.

9. A set of an ink and a cleaning solution, the set comprising:
an ink; and
a cleaning solution,
wherein:
the ink comprises resin particles;
the cleaning solution consisting of:
water;
a compound represented by formula (1):

(1)

a glycol ether compound; and
a surfactant;
the glycol ether compound dissolves in an amount of greater than 5 gin 100 g of water having a temperature of 25 degrees C.;
a proportion of the glycol ether compound is 1 percent by mass or greater but 30 percent by mass or less of a total amount of the cleaning solution; and
$R^1$ represents an alkyl group that comprises 1 or more but 4 or less carbon atoms,
wherein the compound represented by general formula (1) is present in an amount of 40 percent by mass or greater of a total amount of the cleaning solution, and
wherein the water is present in an amount of 10 percent to 60 percent by mass of a total amount of the cleaning solution.

10. The set of an ink and a cleaning solution according to claim 9, wherein:
the glycol ether compound comprises a dialkyl glycol ether compound represented by formula (2):

$R^2$ represents $CnH_{2n+1}$ where n is from 1 through 4;
$R^3$ represents a hydrogen atom or a methyl group; and
m represents an integer of from 1 through 4.

11. A printing method, comprising:
discharging an ink from a nozzle of an ink discharging head; and
cleaning a nozzle surface of the ink discharging head,
wherein the cleaning comprises:
applying a cleaning solution to a wiping member; and
wiping the nozzle surface with the wiping member to which the cleaning solution is applied, and
wherein the set of claim 5 provides the cleaning solution and the ink.

12. A printing apparatus, comprising:
a discharging unit configured to discharge an ink from a nozzle of an ink discharging head; and
a cleaning apparatus configured to clean a nozzle surface of the ink discharging head,
wherein the cleaning apparatus comprises:
a unit comprising the cleaning solution of the set of claim 9 and configured to apply the cleaning solution to a wiping member; and
a unit configured to wipe the nozzle surface with the wiping member to which the cleaning solution is applied, and
wherein the set of claim 9 provides the ink.

* * * * *